(No Model.)
W. M. JUSTICE.
CYCLE STAND.
No. 488,395.　　　　　　　　　　　Patented Dec. 20, 1892.
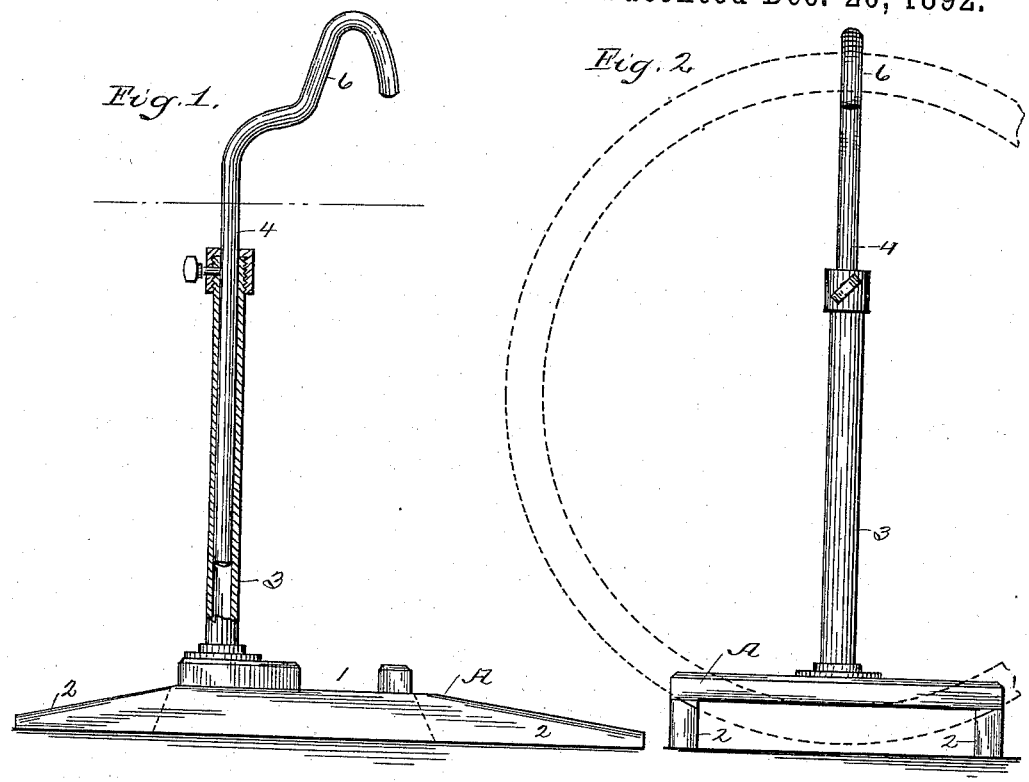
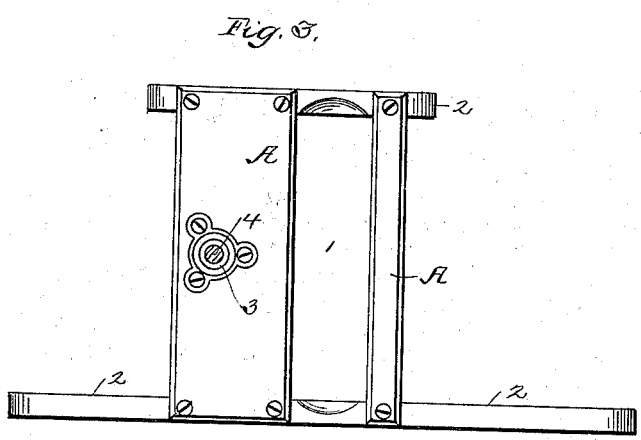
Witnesses:
M. W. Caskey
William Beal
Inventor,
Wm. M. Justice
by his Attorney
Wm. L. Pierce.

UNITED STATES PATENT OFFICE.

WILLIAM M. JUSTICE, OF PITTSBURG, PENNSYLVANIA.

CYCLE-STAND.

SPECIFICATION forming part of Letters Patent No. 488,395, dated December 20, 1892.

Application filed April 18, 1892. Serial No. 429,534. (No model.)

*To all whom it may concern:*

Be it known that I, WILLIAM M. JUSTICE, a citizen of the United States, residing at Pittsburg, in the county of Allegheny and State of Pennsylvania, have invented or discovered a new and useful Cycle-Stand, of which the following is a specification.

In the accompanying drawings which make part of this specification, Figure 1, is a side elevation partly in section of my cycle stand; Fig. 2 is an end view of same showing wheel held in position; Fig. 3 is a plan of the cycle base.

The purpose of my invention generally stated is to devise a cheap, simple and efficient stand for cycles for use either by dealers or private owners.

In the accompanying drawings which makes part of this specification, A is a base preferably of wood, having a slot or depression, 1, for the reception of the tire of a cycle. I insure increased stability with a minimum of material by running out arms, 2, 2, from the base but these can be omitted and any form or size of base used that is desired. Suitably secured to said base is a hollow standard 3 in which is telescoped an extension arm 4 adjustably secured by set screws. The outer end of said extension arm, 4, is forked as at, 6, to embrace the tire of the wheel. The opening of the mouth of the fork is wide enough to receive the broadest tire made while the inner part of the fork tapers down to clasp narrower tires.

The operation of my stand is quite apparent. The wheel of the cycle is dropped into the depression on the base of the stand, the extension arm adjusted over the tire, as the case may be and clamped in position by the set screw. I prefer owing to the presence of the guard over the rear wheel to clamp the cycle by the front wheel, but it can be secured by the guard or tire of the rear wheel if necessary.

I do not limit myself to a telescoping support as the vertical part of the stand may be made in two parts and hinged together and swung in position, or may be made non-adjustable in one piece, or otherwise variously modified, nor do I limit myself to any specific shape of fork at the top of the standard.

Having described my invention, I claim,

A cycle stand consisting of a slotted base to receive the bottom of the wheel tire, and an upright secured to said base and provided with a clamp to reach over the top of the tire at a point diametrically opposite to the slot in the base, thus making a rigid wheel, substantially as described and shown.

In testimony whereof I have hereunto set my hand this 13th day of April, A. D. 1892.

WILLIAM M. JUSTICE.

Witnesses:
  WM. L. PIERCE,
  WILLIAM BEAL.